United States Patent
Story

(10) Patent No.: US 6,325,352 B1
(45) Date of Patent: Dec. 4, 2001

(54) TELECOMMUNICATIONS EQUIPMENT MOUNTING BASE

(75) Inventor: Douglas R. Story, Sachse, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/465,865

(22) Filed: Dec. 16, 1999

(51) Int. Cl.$^7$ .................................................. B65D 19/28
(52) U.S. Cl. ..................... 248/678; 108/57.17; 108/55.1
(58) Field of Search .................. 248/346.01, 346.07, 248/346.5, 678; 108/51.11, 55.1, 55.3, 55.5, 57.17, 57.21, 57.32, 57.33, 57.2, 57.23, 57.24

(56) References Cited

U.S. PATENT DOCUMENTS

| | | | | |
|---|---|---|---|---|
| 1,840,971 | * | 1/1932 | Polk | 108/57.21 |
| 4,230,050 | * | 10/1980 | Mays | 108/51.1 |
| 4,917,345 | * | 4/1990 | Czech | 248/678 |
| 5,180,134 | * | 1/1993 | Mallak | 248/544 |
| 5,402,735 | * | 4/1995 | DeJean | 108/51.1 |
| 5,626,231 | * | 5/1997 | Kwong et al. | 206/600 |
| 5,967,056 | * | 10/1999 | Plante | 108/56.1 |

* cited by examiner

Primary Examiner—Anita King
Assistant Examiner—Jon Szumny
(74) Attorney, Agent, or Firm—Ericsson Inc.; Roger S. Burleigh

(57) ABSTRACT

An improved mounting base 300 for telecommunications equipment racks, including i) first and second side members 310-A and 310-B having upper planar portions 315 including means 311 for coupling the mounting base to a bottom portion of an equipment rack; and ii) forward and rearward cross members 320-A and 320-B having lower planar portions 325 including means 326 for coupling the mounting base to a floor surface. The upper planar portion 315 of each side member is disposed above the lower planar portions 326 of each cross member. When coupled to a bottom portion of an equipment rack, the forward cross member 320-A is disposed proximate a front portion of the equipment rack and defines an access passage between the lower planar portion 325 of the forward cross member and the bottom portion of the equipment rack, such that the access passage allows frontal access to the means 326 for coupling of the rearward cross member to a floor surface.

17 Claims, 3 Drawing Sheets

TELECOMMUNICATIONS EQUIPMENT MOUNTING BASE

TECHNICAL FIELD OF THE INVENTION

The present invention is directed, in general, to wireless communications systems and, more specifically, to a mounting base for telecommunications equipment racks.

BACKGROUND OF THE INVENTION

The world is currently experiencing revolutionary changes in communications systems, brought about, in part, by the general availability of access to, and evolution of, wireless telephony systems. It has been predicted that wireless telephony will eventually replace much of the existing wireline telephony systems; the period during which that will occur, however, is a function of the rate at which such systems can be developed and deployed.

To deploy a wireless telecommunications system requires the construction of Base Transceiver Stations (BTSs), or cell sites, that house the telecommunications system components. Typically, such system components are mounted in equipment racks, and most cell sites require the installation of at least several equipment racks. A conventional equipment rack, or cabinet, usually includes a removable mounting base that is used to secure the equipment rack to the floor of the cell site housing structure. A mounting base must be strong enough to support the weight of the equipment rack and the system components mounted therein. Furthermore, in some geographical locations, such as California, a mounting base must be sufficiently strong to withstand the forces generated by earthquakes.

In addition to the structural rigidity of a mounting base, the mounting base is preferably designed to allow for easy and rapid installation. The design of a mounting base, however, can be complicated by the fact that an equipment rack is typically installed immediately adjacent to, or between, other equipment racks. Thus, the presence of previously installed equipment racks can obstruct access to the means provided on a mounting base for securing it to an equipment rack and the floor of the cell site housing structure. Conventional mounting bases have not effectively addressed the problem of easy installation.

Accordingly, there is a need in the art for an improved mounting base for telecommunications equipment racks. Preferably, such mounting base will be structural rigid, and provide easy access to the means provided on the mounting base for securing it to an equipment rack and the floor of the cell site housing structure, whereby such equipment racks can be easily and rapidly installed.

SUMMARY OF THE INVENTION

To address the above-discussed deficiencies of the prior art; the present invention relates to an improved mounting base for telecommunications equipment racks. The mounting base includes first and second side members, each side member having an upper planar portion including means for coupling the mounting base to a bottom portion of an equipment rack; and forward and rearward cross members, each cross member having a lower planar portion including means for coupling the mounting base to a floor surface. The upper planar portion of each side member is disposed above the lower planar portions of each cross member. When coupled to a bottom portion of an equipment rack, the forward cross member is disposed proximate a front portion of the equipment rack and defines an access passage between the lower planar portion of the forward cross member and the bottom portion of the equipment rack, such that the access passage allows frontal access to the means for coupling of the rearward cross member when the mounting base is disposed between a floor surface and the bottom portion of the equipment rack. The access passage of the mounting base allows for easier installation and removal of telecommunications equipment racks, particularly when a rack is to be positioned adjacent to, or between, other equipment racks.

In an exemplary embodiment, each of the first and second side members has a sidewall portion extending downwardly from and substantially perpendicular to the upper planar portion. In a particular embodiment described in detail hereinafter, the forward and rearward cross members include end portions having upwardly extending wall portions that engage and support the upper planar portions of the first and second side members. In a related embodiment, the rearward cross member has a sidewall portion extending upwardly from and substantially perpendicular to the lower planar portion. The sidewall portions of the first and second side members and forward and rearward cross members add strength and rigidity to the mounting base.

In an exemplary embodiment, the means for coupling the first and second side members to the bottom portion of an equipment rack, and the forward and rearward cross members to a floor surface, define apertures through which mounting bolts can be disposed. The mounting bolts can be placed through the apertures to engage internally-threaded means within the bottom portion of an equipment rack and a floor surface; alternatively, the mounting base can be positioned over threaded mounting studs affixed to the bottom portion of an equipment rack and/or a floor surface, and nuts can be placed thereon to secure the mounting base to the equipment rack and/or floor surface.

In one embodiment, the mounting base further includes a removable cable tray. The cable tray is preferably couplable to a front portion of the forward cross member, such that the cable tray substantially blocks the access passage between the lower planar portion of the forward cross member and the bottom portion of the equipment rack. The cable tray can be installed after securing the mounting base to an equipment rack and a floor surface. The mounting base can also include a drip tray disposed between the forward and rearward cross members; the drip tray is preferably removable. The drip tray provides a fire barrier between the electronic components mounted in the equipment rack and the floor surface on which the equipment rack is mounted.

To compensate for differences in height between an equipment rack and adjacent racks, which can prevent the use of cross braces, the mounting base can also include first and second mounting shims couplable to the upper planar portions of the first and second side members, respectively. The mounting shims have a thickness selected as a function of the height of a second mounting base adjacent to the mounting base.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which.

DETAILED DESCRIPTION

Figure 1:
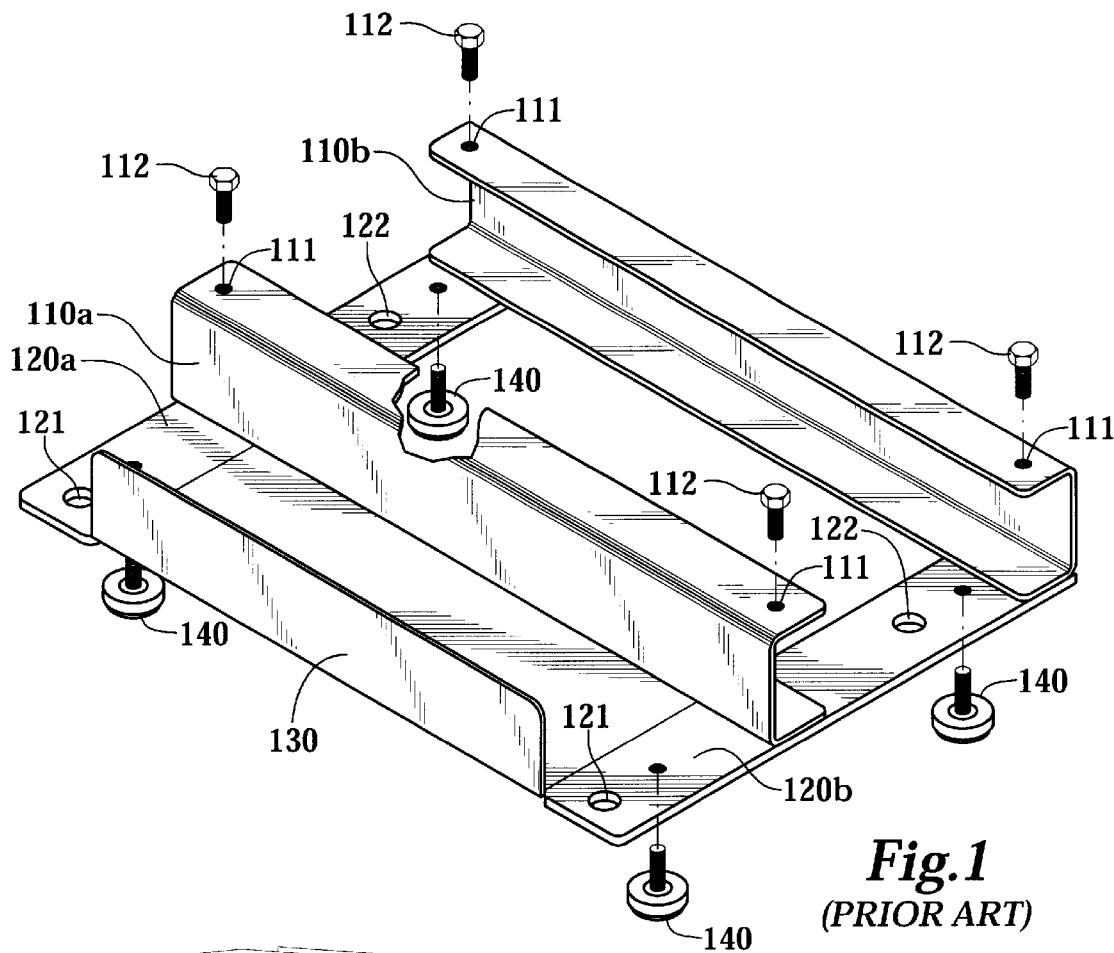
FIG. 1 illustrates a prior art mounting base.

In order to better understand the principles and advantages of the present invention, reference is first made to FIG. 1, which illustrates a prior art mounting base 100. The mounting base 100 includes front and rear cross members 110-A and 110-B, respectively. The front and rear cross members 110-A and 110-B each include threaded holes 111 for securing an electronics rack cabinet (not shown) thereto by means of bolts 112. The front and rear cross members 110-A, 110-B are coupled by left and right side members 120-A and 120-B, respectively. The left and right side members 120-A, 120-B extend forwardly from front cross member 110-A; a vertical lip member 130 spans the space between the left and right side members to form a cable tray between the lip member 130 and the front cross member 110-A. The left and right side members 120-A and 120-B each include forward mounting holes 121 and rearward mounting holes 122; the forward mounting holes 121 are disposed forward of front cross member 110-A, while the rearward mounting holes 122 are disposed between the front cross member 110-A and rearward cross member 110-B. Bolts (not shown) can be placed through the forward and rearward mounting holes 121 and 122 to secure the mounting base 100 to a floor surface. Leveling feet 140 are threadably coupled to the left and right side members 120-A and 120-B.

The particular disadvantage of the prior art mounting base 100 is that the rearward mounting holes 122 are occluded by the front cross member 110-A. Thus, if an equipment rack must be installed adjacent to other installed equipment racks or a wall, it may be necessary to secure the mounting base 100 to the floor surface prior to mounting the equipment rack cabinet thereon. If an equipment rack using the mounting base 100 is to be installed between other already installed equipment racks, it is absolutely necessary to first install the mounting base 100 prior to securing the electronics rack cabinet thereon, since the previously installed equipment racks would block access to the rearward mounting holes 121. These problems generally prevent securing the mounting base 100 to an equipment rack cabinet and moving the equipment rack into its desired location prior to securing the mounting base 100 to the floor surface.

Figure 2:
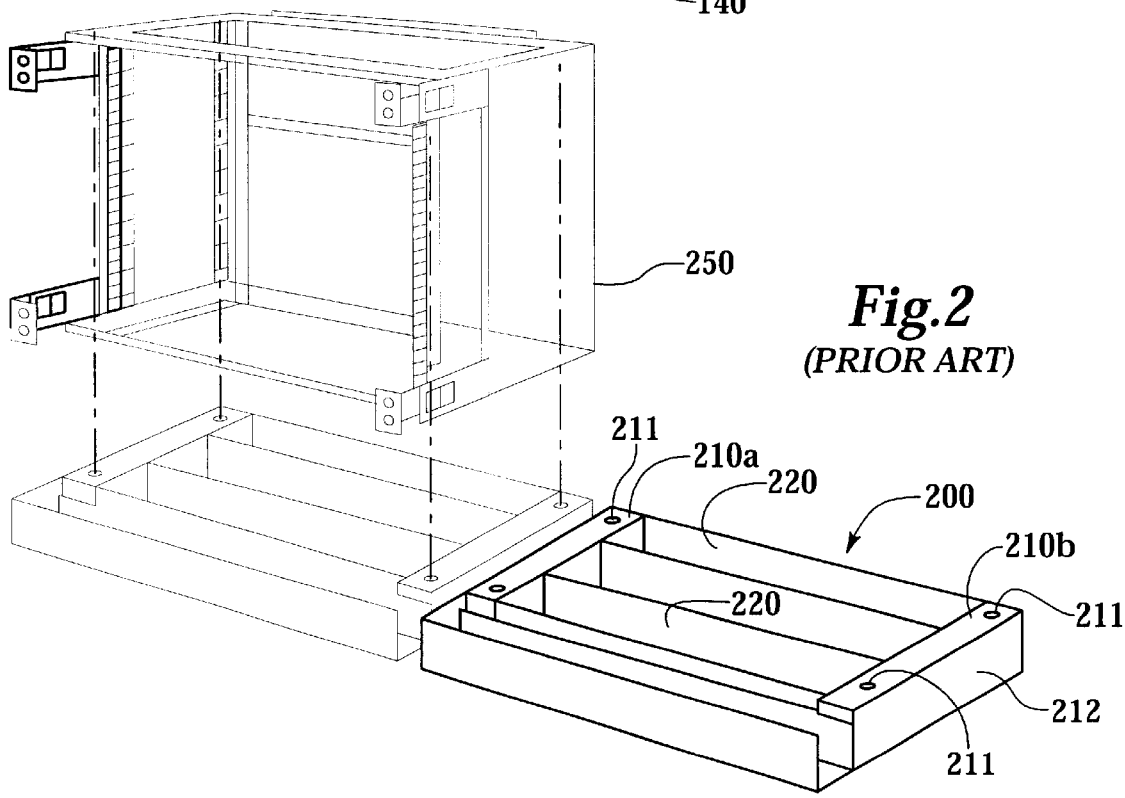
FIG. 2 illustrates the installation of an equipment rack cabinet on a second prior art mounting base.

Turning now to FIG. 2, illustrated is the installation of an equipment rack cabinet 250 on a second prior art mounting base 200. Mounting base 200 has a different construction than mounting base 100, but has the same disadvantages. The mounting base 200 includes left and right side members 210-A and 210-B, which include threaded mounting holes, generally designated 211, for securing the equipment rack cabinet 250 thereon. Front and rear cross members, generally designated 220, couple the left and right side members 210-A and 210-B; the front and rear cross members 220 have a channel profile and include mounting holes (not shown) on a bottom portion for securing the mounting base 200 to a floor surface. Because the left and right side members 210-A and 210-B have a vertical wall portion 212 that blocks side access to the mounting holes on the bottom portion of the front and rear cross members 220, and the front and rear cross members 220 have vertical walls that also preclude access from the front or rear, the mounting base 200 must be secured to a floor surface prior to mounting the equipment rack cabinet 250 thereto. Thus, prior art mounting base 200 also has the disadvantages associated with prior art mounting base 100.

Figure 3:
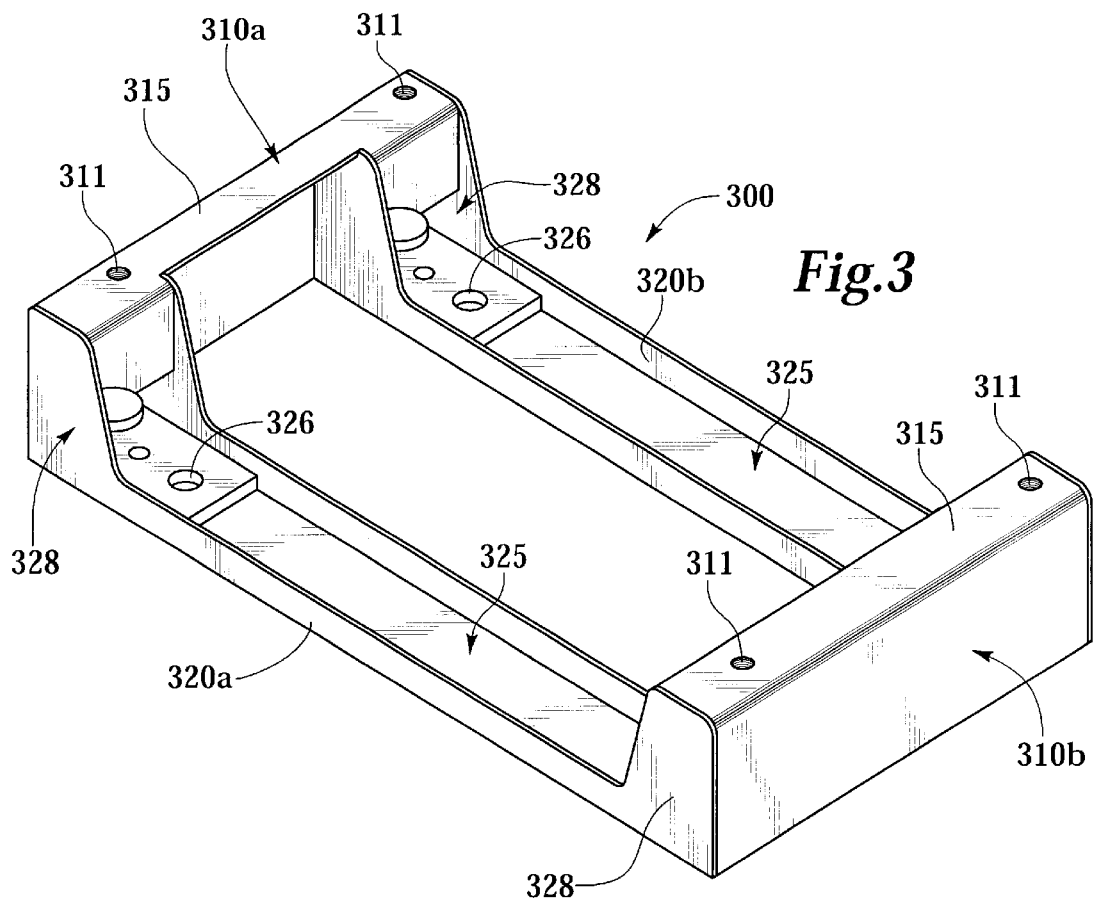
FIG. 3 illustrates an exemplary mounting base in accordance with the principles of the present invention.

Referring now to FIG. 3, illustrated is an exemplary mounting base 300 in accordance with the principles of the present invention. The mounting base 300 includes left and right side members 310-A and 310-B. The side members 310-A and 310-B have an upper planar portion 315 including threaded mounting holes, generally designated 311, for securing the bottom portion of an equipment rack cabinet thereon. The left and right side members 310-A and 310-B are joined by forward and rearward cross members 320-A and 320-B, respectively. The forward and rearward cross members 320-A and 320-B each have a lower planar portion 325 including apertures, generally designated 326, for coupling the mounting base 300 to a floor surface. The forward and rearward cross members 320-A and 320-B also include end portions, generally designated 328, having upwardly extending wall portions that engage and support the upper planar portions 315 of the first and second side members 310-A and 310-B.

As can be seen in FIG. 3, the upper planar portions 315 of the left and right side members 310-A and 310-B are disposed above the lower planar portions 325 of the forward and rearward cross members 310-A and 310-B. Because the forward and rearward cross members 320-A and 320-B do not have sidewall portions that extend vertically to the level of the upper planar portions 315 of the left and right side members 310-A and 310-B, the cross members will define an access passage between the lower planar portions 325 thereof and a bottom portion of an equipment rack when coupled thereto. The access passages thus defined will allow both front and rear access to the apertures 326 for coupling of the cross members to a floor surface when the mounting base 300 is disposed between a floor surface and a bottom portion of an equipment rack. As those skilled in the art will recognize, unlike the prior art mounting bases 100 and 200, the mounting base 300 allows for pre-mounting of an equipment rack cabinet thereto prior to positioning the equipment rack for mounting to a floor surface, even if the equipment rack is to be installed adjacent to, or between, other equipment racks or walls. Furthermore, a complete equipment rack can be uninstalled without requiring removal of the equipment rack cabinet from the mounting base 300. Therefore, the mounting base 300 overcomes the disadvantages of the prior art and allows for equipment racks to be easily and rapidly installed or uninstalled.

Figure 4:
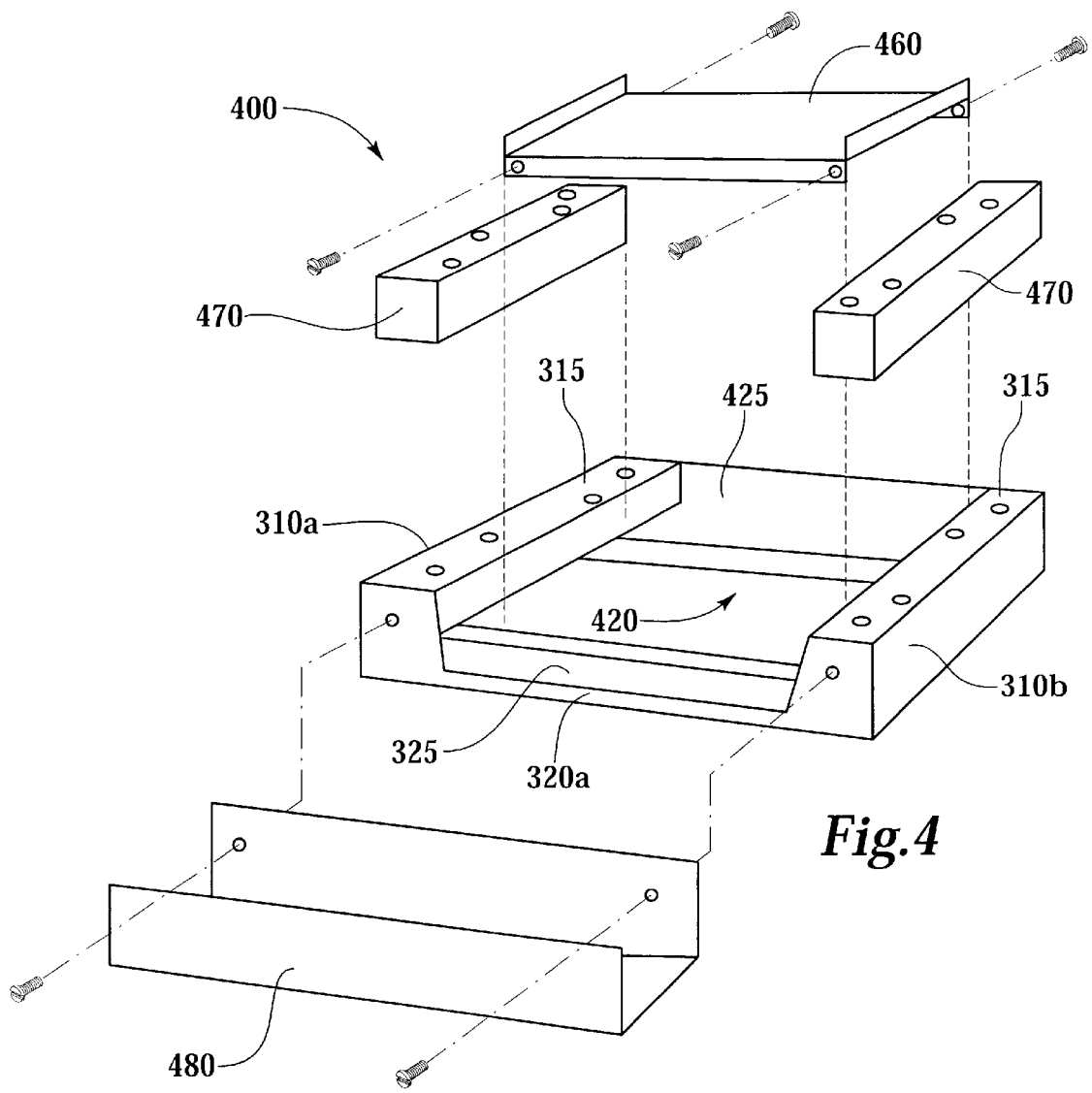
FIG. 4 illustrates additional features of a mounting base in accordance with the principles of the present invention.

Turning now to FIG. 4, illustrated are additional features of an exemplary mounting base 400 in accordance with the principles of the present invention. The exemplary mounting base 400 is substantially similar to exemplary mounting base 300, and its general structure will not be further described. Unlike mounting base 300, however, the rearward cross member 420 of mounting base 400 includes a vertical rear wall portion 425 that blocks rear access to the apertures in the cross members for securing the mounting base 400 to a floor surface. Because the apertures are still accessible from the front of the mounting base 400, an equipment rack cabinet can still be pre-mounted thereto prior to positioning the equipment rack for mounting to a floor surface. In addition, the vertical rear wall portion 425 of rearward cross member 420 provides additional structural rigidity and provides a fire barrier as described hereinafter.

The additional features provided by mounting base 400 include a drip tray 460, mounting shims 470, and a cable tray 480. The drip tray is removably couplable to the forward and rearward cross members; in alternative embodiments, the drip tray could be permanently affixed to, or integral with, the front and rear cross members. In case of a fire or overheating in any of the electronic system components mounted in the equipment rack cabinet, the drip tray 460 provides a barrier to prevent flames or hot materials from contacting the floor surface beneath the mounting base 400; this is particularly important if the floor surface is flammable, such as wood. As noted above, the vertical rear wall portion 425 of rearward cross member 420 also provides a fire barrier.

The cable tray 480 is removably couplable to the forward cross member 320-A. The cable tray 480 is necessarily removable to provide frontal access to the means for securing the mounting base 400 to a floor surface. When installed, the cable tray 480 substantially blocks the access passage between the lower planar portion 325 of the forward cross member 320-A and the bottom portion of an equipment rack cabinet secured to the mounting base 400. In addition, the cable tray 480 provides a barrier to prevent flames or hot materials from contacting the floor surface beneath the mounting base 400.

Finally, the exemplary mounting base 400 also includes first and second mounting shims 470 couplable to the upper planar portions 315 of the left and right side members 310-A and 310-B. In some installations, an equipment rack cabinet using mounting base 400 may be installed adjacent to an equipment rack cabinet mounted on a base having a different height than mounting base 400. This situation can present a problem because bracing members are typically used to secure each equipment rack cabinet to adjacent cabinets; if the cabinets are at different heights, it may not be possible to properly install the bracing members. Thus, the mounting shims 470 can be used to raise the height of an equipment rack cabinet mounted on mounting base 400; the thickness of the mounting shims 470 are selected as a function of the height of a mounting base adjacent to the mounting base 400.

Figure 5:
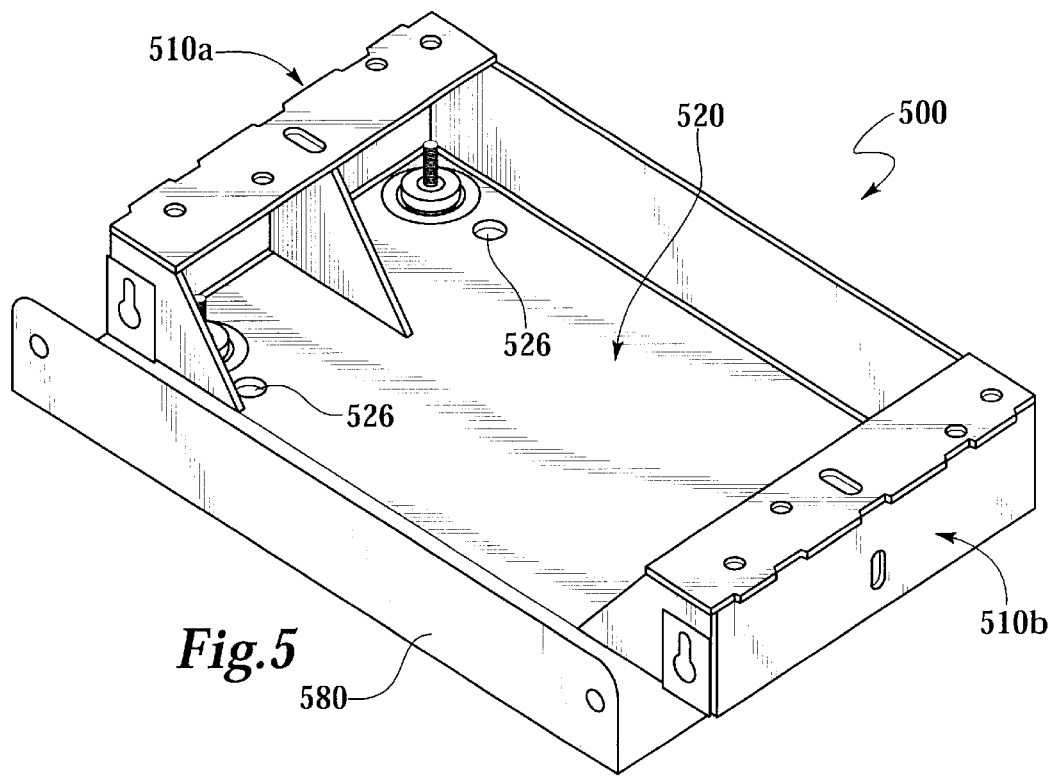
FIG. 5 illustrates a second exemplary embodiment of a mounting base in accordance with the principles of the present invention.

Although the foregoing descriptions of exemplary mounting bases 300 and 400 have described the mounting bases as having distinct left and right side members, and forward and rearward cross members, a mounting base can be implemented in a substantially unitary structure without departing from the principles of the present invention, this aspect of the invention is shown in FIG. 5. In the exemplary mounting base 500, a unitary base panel 520 provides the same functionality of the forward and rearward cross members of the other exemplary embodiments, as well as providing the functionality of a drip tray. In addition, a vertical rear wall portion 525, which may be formed from a continuous metal sheet with base panel 520, blocks rear access to apertures 526 for securing the mounting base 500 to a floor surface, and provides a barrier to prevent flames or hot materials from contacting the floor surface beneath the mounting base 500. Similarly, left and right side members 510-A and 510-B can be formed from the same continuous metal sheet with base panel 520 to provide the structure necessary to secure the mounting base 500 to the bottom portion of an equipment rack cabinet. Furthermore, although illustrated as being removably coupled to the mounting base, those skilled in the art will recognize that a cable tray portion 580 can also be formed from the same continuous metal sheet with base panel 520.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined only by the claims appended hereto, and their equivalents.

What is claimed is:

1. A mounting base for a telecommunications equipment rack, said mounting base comprising:

first and second side members, each of said side members having an upper planar portion including means for coupling said mounting base to a bottom portion of said equipment rack;

forward and rearward cross members, each of said cross members having a lower planar portion including means for coupling said mounting base to a floor surface, said upper planar portion of said side members being disposed above said lower planar portions of said cross members, said forward cross member adapted to be disposed proximate a front portion of said equipment rack and adapted to define an access passage between said lower planar portion of said forward cross member and said bottom portion of said equipment rack when coupled thereto, said access passage allowing frontal access to said means for coupling of said rearward cross member when said mounting base is disposed between said floor surface and said bottom portion of said equipment rack; and a removable cable tray, said removable cable tray being couplable to a front portion of said forward cross member, said cable tray substantially blocking said access passage between said lower planar portion of said forward cross member and said bottom portion of said equipment rack.

2. The mounting base recited in claim 1, wherein each of said first and second side members further comprises a sidewall portion extending downwardly from and substantially perpendicular to said upper planar portion.

3. The mounting base recited in claim, 1, wherein said rearward cross member further comprises a sidewall portion extending upwardly from and substantially perpendicular to said lower planar portion.

4. The mounting base recited in claim 1, wherein said forward and rearward cross members include end portions having upwardly extending wall portions that engage and support said upper planar portions of said first and second side members.

5. The mounting base recited in claim 1, wherein said means for coupling said first and second side members to said bottom portion of said equipment rack, and said-forward and rearward cross members to a floor surface, define apertures through which mounting bolts can be disposed.

6. The mounting base recited in claim 1, further comprising first and second mounting shims couplable to said upper planar portions of said first and second side members, respectively, said mounting shims having a thickness selected as a function of the height of a second mounting base adjacent to said mounting base.

7. The mounting base recited in claim 1, further comprising a drip tray disposed between said forward and rearward cross members.

8. The mounting base recited in claim 7, wherein said drip tray is removable.

9. A method for installing a telecommunications equipment rack, said method comprising the steps of:

coupling said equipment rack to first and second side members of a mounting base, each of said side members having an upper planar portion including means for coupling said mounting base to a bottom portion of said equipment rack;

coupling forward and rearward cross members of said mounting base to a floor surface, each of said cross members having a lower planar portion including means for coupling said mounting base to said floor surface, said upper planar portion of said side members being disposed above said lower planar portions of said cross members, said forward cross member being disposed proximate a front portion of said equipment rack and defining an access passage between said lower planar portion of said forward cross member and said bottom portion of said equipment rack when coupled thereto, said access passage allowing frontal access to said means for coupling of said rearward cross member when said mounting base is disposed between said floor surface and said bottom portion of said equipment rack; and coupling a removable cable tray to a front portion of said forward cross member, said cable tray substantially blocking said access passage between said lower planar portion of said forward cross member and said bottom portion of said equipment rack.

10. The method recited in claim 9, wherein each of said first and second side members further comprises a sidewall portion extending downwardly from and substantially perpendicular to said upper planar portion.

11. The method recited in claim 9, wherein said rearward cross member further comprises a sidewall portion extending upwardly from and substantially perpendicular to said lower planar portion.

12. The method recited in claim 9, wherein said forward and rearward cross members include end portions having upwardly extending wall portions that engage and support said upper planar portions of said first and second side members.

13. The method recited in claim 9, wherein said means for coupling said first and second side members to said bottom portion of said equipment rack, and said forward and rearward cross members to a floor surface, define apertures through which mounting bolts can be disposed.

14. The method recited in claim 9, further comprising the step of coupling a drip tray between said forward and rearward cross members.

15. The method recited in claim 9, further comprising the step of coupling first and second mounting shims to said upper planar portions of said first and second side members, respectively, said mounting shims having a thickness selected as a function of the height of a second mounting base adjacent to said mounting base.

16. A telecommunications equipment rack, comprising:

a cabinet for removably receiving a plurality of electronic components; and a mounting base removably coupled to a bottom portion of said cabinet, said mounting base comprising:

first and second side members, each of said side members having an upper planar portion including means for coupling said mounting base to said bottom portion of said cabinet; and forward and rearward cross members, each of said cross members having a lower planar portion including means for coupling said mounting base to a floor surface, said upper planar portion of said side members being disposed above said lower planar portions of said cross members, said forward cross member being disposed proximate a front portion of said cabinet and defining an access passage between said lower planar portion of said forward cross member and said bottom portion of said cabinet when coupled thereto, said access passage allowing frontal access to said means for coupling of said rearward cross member when said mounting base is disposed between said floor surface and said bottom portion of said equipment rack; and a removable cable tray, said removable cable tray being couplable to a front portion of said forward cross member, said cable tray substantially blocking said access passage between said lower planar portion of said forward cross member and said bottom portion of said cabinet.

17. The telecommunications equipment rack recited in claim 16, further comprising first and second mounting shims couplable intermediate to said upper planar portions of said first and second side members, respectively, and said bottom portion of said cabinet, said mounting shims having a thickness selected as a function of the height of a second telecommunications equipment rack located adjacent to said telecommunications equipment rack.

* * * * *